(12) United States Patent
Hendriks et al.

(10) Patent No.: US 7,292,517 B2
(45) Date of Patent: *Nov. 6, 2007

(54) OPTICAL SCANNING DEVICE FOR USE WITH MULTIPLE TYPES OF RECORD CARRIER SURFACES

(75) Inventors: Bernardus Hendrikus Wilhelmus Hendriks, Eindhoven (NL); Jorrit Ernst De Vries, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 382 days.

This patent is subject to a terminal disclaimer.

(21) Appl. No.: 10/297,121

(22) PCT Filed: Apr. 4, 2002

(86) PCT No.: PCT/IB02/01063

§ 371 (c)(1),
(2), (4) Date: Dec. 2, 2002

(87) PCT Pub. No.: WO02/082437

PCT Pub. Date: Oct. 17, 2002

(65) Prior Publication Data

US 2003/0151996 A1      Aug. 14, 2003

(30) Foreign Application Priority Data

Apr. 5, 2001    (EP)  .................................. 01201255

(51) Int. Cl.
*G11B 7/135* (2006.01)
*G02B 26/08* (2006.01)

(52) U.S. Cl. ............................ 369/112.26; 369/112.18; 369/121; 359/205; 359/569

(58) Field of Classification Search ............... 369/53.2, 369/121, 112.26, 112.1, 112.18; 359/205; *G11B 7/00, G11B 7/135; G02B 26/08*
See application file for complete search history.

(56) References Cited

U.S. PATENT DOCUMENTS 5,073,007 A * 12/1991 Kedmi et al. ............... 359/565

(Continued)

FOREIGN PATENT DOCUMENTS

EP         1022731 A2      7/2000

OTHER PUBLICATIONS

MAT (machine assisted translation) of JP 2001-209966.*

(Continued)

*Primary Examiner*—Aristotelis M. Psitos
(74) *Attorney, Agent, or Firm*—Michael E. Belk (57) ABSTRACT

An optical scanning device for scanning of a first, second and third type of optical record carrier with radiation of a first wavelength $\lambda_1$, a second wavelength $\lambda_2$ and a third wavelength $\lambda_3$, respectively, where the three wavelengths are substantially different.

The device comprises: a radiation source for emitting a beam of said radiation, an objective system for converging the beam on a selected one of the optical record carriers, and a phase structure arranged in the path of the beam, the phase structure comprising a plurality of phase elements of different heights, forming a non-periodic stepped profile of optical paths in the beam, and is characterised in that the stepped profile substantially approximates a flat wavefront at the first wavelength $\lambda_1$, a spherical aberration wavefront at the second wavelength $\lambda_2$, and a flat or spherical aberration wavefront at the third wavelength $\lambda_3$.

14 Claims, 3 Drawing Sheets

U.S. PATENT DOCUMENTS

| | | | |
|---|---|---|---|
| 5,227,915 A * | 7/1993 | Grossinger et al. | 359/565 |
| 5,446,565 A * | 8/1995 | Komma et al. | 369/44.23 |
| 5,526,338 A * | 6/1996 | Hasman et al. | 369/94 |
| 5,777,803 A * | 7/1998 | Ju et al. | 359/719 |
| 6,084,843 A * | 7/2000 | Abe et al. | 369/112.07 |
| 6,104,688 A * | 8/2000 | Kikuchi et al. | 369/112.26 |
| 6,687,037 B2 * | 2/2004 | Hendriks et al. | 359/205 |
| 6,760,159 B2 * | 7/2004 | Nakai | 359/576 |
| 6,829,209 B1 * | 12/2004 | Tanaka et al. | 369/112.23 |
| 6,930,973 B2 * | 8/2005 | Hendriks et al. | 369/112.06 |
| 6,956,807 B2 * | 10/2005 | De Vries et al. | 369/112.06 |

OTHER PUBLICATIONS

Dual-Wabelength optical head with a wavelength-selective filter for 0.6 and 1.2 mm thick substrate optical disks—Katayama et al, Applied Optics, vol. 38, No. 17, Jun. 10, 1999.*

Yamada et al: "DVD/CD/CD-R Compatible Pick-up With Two-wavelength two-beam Laser" IEEE Transactions On Consumer Electronics, vol. 44, No. 3, Aug. 1998, pp. 591-600.

* cited by examiner

OPTICAL SCANNING DEVICE FOR USE WITH MULTIPLE TYPES OF RECORD CARRIER SURFACES

The present invention relates to an optical scanning device comprising an optical objective lens. One particular illustrative embodiment of the invention relates to an optical scanning device that is capable of reading data from three different types of optical record carriers, such as compact discs (CDs), conventional digital versatile discs (DVDs) and so-called next generation DVDs.

These so-called next generation DVDs have recently been proposed following the advent of blue laser diodes that emit light at a significantly shorter wavelength than the red laser diodes used to read or write data from conventional DVDs. As the wavelength of the blue laser diode is shorter than that of more commonly used red laser diodes, the blue laser diode can form a smaller spot on the DVD, and hence the tracks of next generation DVDs can be more closely spaced than those of conventional DVDs, which in turn means that these next generation DVDs can have a greater data storage capacity than conventional DVDs—typically at least a two-fold increase in storage capacity can be obtained.

Conventional DVDs and next generation DVDs will be referred to herein, as is usual in the art, as Red-DVDs and Blue-DVDs respectively.

To avoid customers having to purchase a variety of different devices for reading or writing data from or to specific types of optical record carrier, it is desirable for a single optical scanning device to be capable of reproducing data, for example, from a number of optical record carriers of different formats.

However, this laudable aim is not as easy to accomplish as it might otherwise seem—principally because these different format record carriers and associated scanning devices have varying characteristics.

For example, CDs are available, inter alia, as CD-A (CD-audio), CD-ROM (CD-read only memory) and CD-R (CD-recordable), and are designed to be scanned with a laser wavelength of about 780 nm and a numerical aperture (NA) of 0.45. Red-DVDs, on the other hand, are designed to be scanned at a laser wavelength in the region of 660 nm, and Blue-DVDs are designed to be scanned at a laser wavelength in the region of 405 nm. For reading DVDs an NA of 0.6 is generally used, whereas for writing DVDs an NA of 0.65 is generally required.

A complicating factor is, that discs designed to be read out at a certain wavelength are not always readable at another wavelength. An example is the CD-R in which special dyes had to be applied in the recording stack in order to obtain a high modulation at 785 nm wavelength. At 660 nm wavelength the modulation of the signal from the disc becomes so small due to the wavelength sensitivity of the dye that readout at this wavelength is not feasible. On the other hand when introducing a new system with higher data capacities it is important that the new devices for reading and writing are backward compatible with the existing record carriers in order to obtain a high acceptance level in the market. Therefore, the DVD system must contain a 785 nm laser and a 660 nm laser to be able to read all existing CD types. A similar reasoning holds when reading DVD dual layer disks designed for 660 nm with a blue laser. Consequently, a system capable of reading all CD and DVD red/blue must contain a 785 nm laser, 660 nm laser and a 405 nm laser.

DVDs and CDs also differ in the thickness of their transparent substrates, which typically act as a protective layer for the data carrying layer of the disk, and as a result the depth of the data layer from the entrance face of the record carrier varies from record carrier type to record carrier type. For example, the data layer depth for DVDs is about 0.6 mm, whereas the data layer depth for CDs is about 1.2 mm. The spherical aberration incurred by the radiation beam traversing the protective layer is generally compensated in the objective lens of the optical scanning device.

As a result of these different characteristics for different media, problems can result if it is attempted to read data, for example, from an record carrier with an optical scanning device that has been optimised for another, different type of record carrier. For example, large amounts of spherical aberration and a non-negligible amount of spherochromatism can be caused if one type of carrier medium is read with an objective lens that has been optimised for another. The device could be provided with three objective lenses, one for each wavelength. However, this solution would be relatively expensive.

It would therefore be highly preferable to provide a device which has a single optical objective lens for scanning a variety of different optical carrier mediums using different wavelengths of laser radiation.

To this end, it has previously been proposed, in WO 99/57720 for example, to provide systems that are capable of reading data from Red-DVDs and CDs with laser radiation of different wavelengths, whilst using the same objective lens. This document describes a system which uses a moulded plastic objective lens having either two refractive aspheric surfaces or one aspherical surface and one refractive spherical surface including a diffractive element. The lens is capable of correcting for the different spherical aberration caused by the different thickness of the two disc formats as well as for chromatic aberration caused by the different reading wavelengths.

Messrs Katayama, Komatsu and Yamanaka have designed another system which is described in their Applied Optics article entitled: "Dual-Wavelength optical head with a wavelength selective filter for 0.6 and 1.2 mm thick substrate optical disks" (see Applied Optics, Volume 38, No. 17 dated 10 Jun. 1999, page 3778.). Their system comprises a wavelength selective filter which is placed between the laser sources and the objective lens, and which varies the phase distribution of light transmitted through the filter as the wavelength of the light is changed. The filter comprises a concentric phase filter pattern and an interference filter pattern which are formed on the inner region and the outer region, respectively, of a circle whose diameter is less than the objective lens diameter. The interference filter pattern transmits 650 nm light and reflects 780 nm light. This means that the NA for 650 nm light is equal to the maximum NA of the objective lens (i.e. about 0.6), whereas the NA for 780 nm light is determined by the diameter of the circle and is about 0.45. The phase filter pattern comprises a silicon dioxide stepped structure where adjacent steps are of differing height. The particular heights of the steps are chosen so that the phase distribution of transmitted 650 nm light is not affected by the filter, and so that the phase distribution of transmitted 780 nm light is altered to compensate for the spherical aberration and spherochromatism that would otherwise occur. A similar method was described in a document by Messrs Hendriks, de Vries and Urbach published in the proceedings of the Optical Design and Fabrication conference held in Tokyo 2000 on page 325-328 entitled "Application of non-periodic phase structures in optical systems". In this paper also a method was presented to determine the optimum zone distribution.

Whilst each of these previously proposed systems provide a solution for situations where two different optical media are illuminated with two associated different wavelengths of light, they do not provide assistance in situations where it is desired to illuminate and scan more than two different types of carrier media with associated different wavelengths of light.

Accordingly, it is an object of the present invention to alleviate these problems by, for example, providing an optical scanning device for scanning more than two different types of optical record carriers using radiation of more than two wavelengths.

In accordance with a first aspect of the invention, there is provided an optical scanning device for scanning of a first, second and third type of optical record carrier with radiation of a first wavelength $\lambda_1$, a second wavelength $\lambda_2$ and a third wavelength $\lambda_3$, respectively, the three wavelengths being substantially different, the device comprising: a radiation source for emitting a beam of said radiation, an objective system for converging the beam on a selected one of the optical record carriers, and a phase structure arranged in the path of the beam, the phase structure comprising a plurality of phase elements of different heights, forming a non-periodic stepped profile of optical paths in the beam, characterised in that the stepped profile substantially approximates a flat wavefront at the first wavelength $\lambda_1$, a spherical aberration wavefront at the second wavelength $\lambda_2$, and a flat or spherical aberration wavefront at the third wavelength $\lambda_3$.

By virtue of this arrangement it is possible to scan optical carriers with a plurality of different radiation wavelengths, which in turn means that it is possible to provide a single device for scanning a number of different types of optical record carriers.

It is worth noting at this juncture that "flat" as used herein only implies that after taking modulo $2\pi$ of the wavefront, the resulting wavefront is constant, hence the non-periodic phase structure only introduces a constant phase offset. The term "flat" does not necessarily imply that the wavefront exhibits a zero phase change. A second aspect of the invention relates to a lens for use in an optical device for scanning a first, second and third type of optical record carrier with a beam of radiation of a first wavelength $\lambda_1$, a second wavelength $\lambda_2$ and a third wavelength $\lambda_3$, respectively, the three wavelengths being substantially different, the lens comprising:

a phase structure arranged in the path of the beam, the phase structure comprising a plurality of phase elements of different heights, forming a non-periodic stepped profile of optical paths in the beam, characterised in that the stepped profile substantially approximates a flat wavefront at the first wavelength $\lambda_1$, a spherical aberration wavefront at the second wavelength $\lambda_2$, and a flat or spherical aberration wavefront at the third wavelength $\lambda_3$.

Various preferred embodiments of each of these aspects are set out in respective accompanying dependent claims.

Another aspect of the invention relates to an optical scanning device for scanning Red-DVDs, CDs and Blue-DVDs with radiation of a first wavelength $\lambda_1$, a second wavelength $\lambda_2$ and a third wavelength $\lambda_3$ respectively, the device comprising: a phase structure formed on a face of an objective lens, said phase structure being comprised of a plurality of phase elements for introducing phase changes in a beam of said radiation, said phase elements being arranged in a stepped profile with step heights across a diameter of the lens being substantially as follows: 14.040 µm, 5.850 µm, −2.340 µm, 5.850 µm and 14.040 µm; wherein $\lambda_1$ is substantially 660 nm, $\lambda_2$ is substantially 785 nm and $\lambda_3$ is substantially 405 nm.

Yet another aspect of the invention relates to an objective lens for use in an optical scanning device for scanning Red-DVDs, CDs and Blue-DVDs with radiation of a first wavelength $\lambda_1$, a second wavelength $\lambda_2$ and a third wavelength $\lambda_3$ respectively, the lens comprising: a phase structure formed on a face of the lens, said phase structure being comprised of a plurality of phase elements for introducing phase changes in a beam of said radiation, said phase elements being arranged in a stepped profile with step heights across a diameter of the lens being substantially as follows: 14.040 µm, 5.850 µm, −2.340 µm, 5.850 µm and 14.040 µm; wherein $\lambda_1$ is substantially 660 nm, $\mu_2$ is substantially 785 nm and $\mu_3$ is substantially 405 nm.

Embodiments of the invention will now be described, by way of example only, with reference to the accompanying drawings, in which.

The illustrative embodiments of the invention that will now be described refer to a phase structure for use in a system for scanning CDs, Red-DVDs and Blue-DVDs. However, it should be noted that this description is purely illustrative and that the teachings of the invention may be applied in the construction of devices which can scan more than three media. As a result, the forthcoming description should not be construed as limiting the scope of the invention in any way.

Figure 1:
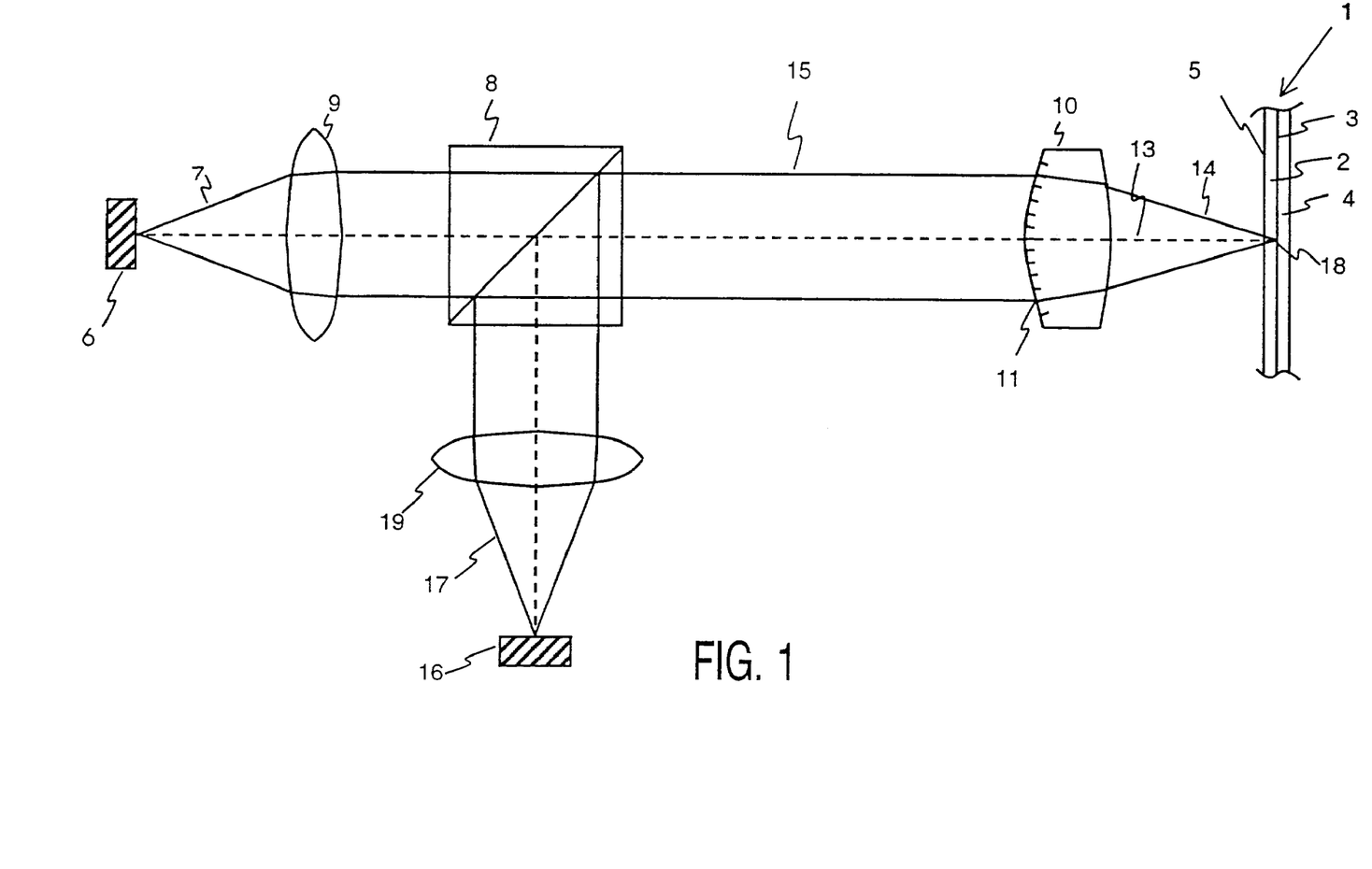
FIG. 1 is a schematic illustration of components of a scanning device for optical record carriers according to one embodiment of the present invention.

FIG. 1 is a schematic illustration of components common to a device in accordance with the embodiment, to be described below, for scanning an optical record carrier 1. The record carrier 1 is in this embodiment an optical disc as will be described, by way of example, below.

The optical disc 1 comprises a transparent layer 2, on one side of which at least one information layer 3 is arranged. The side of the information layer facing away from the transparent layer is protected from environmental influences by a protection layer 4. The side of the transparent layer facing the device is the disc entrance face 5. The transparent layer 2 acts as a substrate for the optical disc by providing mechanical support for the information layer or layers. Alternatively, the transparent layer 2 may have the sole function of protecting the information layer 3, while the mechanical support is provided by a layer on the other side of the information layer, for instance by the protection layer 4 or by a further information layer and transparent layer connected to the uppermost information layer.

Information may be stored in the information layer 3, or information layers, of the optical disc in the form of optically detectable marks arranged in substantially parallel, concentric or spiral tracks, not indicated in FIG. 1. The marks may be in any optically readable form, e.g. in the form of pits, or areas with a reflection coefficient or a direct of magnetisation different from their surroundings, or a combination of these forms.

The scanning device includes a radiation source 6, comprising a tuneable semiconductor laser or three separate semiconductor lasers, emitting radiation of first, second and third wavelengths in a diverging radiation beam 7 towards a lens system. The lens system includes a collimator lens 9 and an objective lens 10 arranged along optical axis 13. The collimator lens 9 transforms the diverging beam 7 emitted from the radiation source 6 into a substantially collimated beam 15. The objective lens 10 comprises a phase element (or phase structure), which is indicated in the drawing by the pattern 11 and which will be described in more detail below. The objective lens 10 transforms the incident collimated radiation beam 15 into a converging beam 14, having a selected NA, which comes to a spot 18 on the information layer 3. A detection system 16, a second collimator lens 19 and a beam splitter 8 are provided in order to detect data signals, and focus error signals which are used to mechanically adjust the axial position of the objective lens 10.

The phase grating 11 as shown in FIG. 1 may be arranged on the side of the objective lens 10 facing the radiation source (referred to herein as the entry face of the lens), or alternatively on the other surface of the lens 10 (referred to herein as the exit face of the lens).

Figure 2:
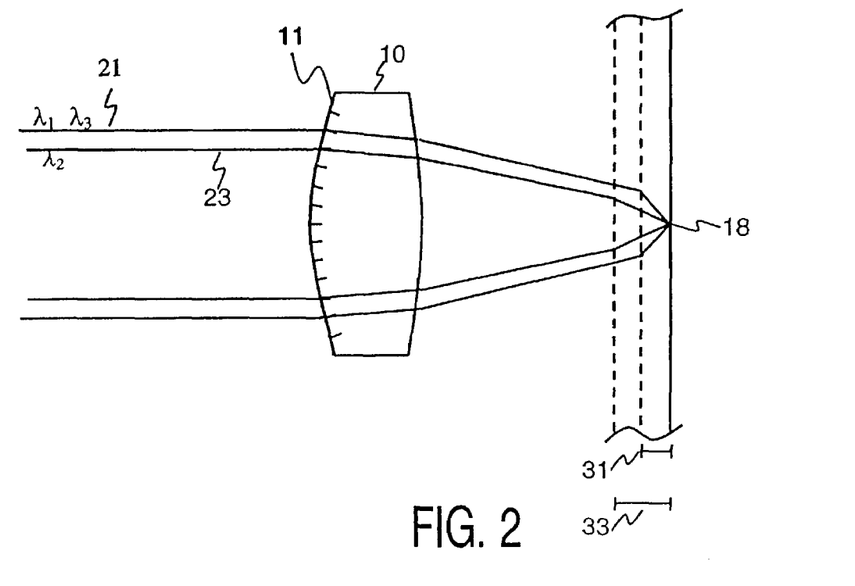
FIG. 2 is a schematic illustration of an objective lens for use in the scanning device of FIG. 1.

FIG. 2 is a schematic illustration of the objective lens 10 for use in the scanning device described above. The scanning device is capable of scanning optical record carriers with a first information layer depth with laser radiation 21 of a first wavelength at a first numerical aperture. The device is further capable of scanning record carriers with a second information layer depth with laser radiation 23 of second and third wavelengths at a second numerical aperture using the same optical objective lens 10. Discs of Red-DVD format may be scanned with laser radiation of a first wavelength $\lambda_1$ between say 620 and 700 nm, preferably $\lambda_1$=660 nm. A numerical aperture of about 0.6 is used for reading Red-DVDs and an NA above 0.6, preferably 0.65, is applied for writing to Red-DVDs. Record carriers of CD format are scanned with laser radiation of a second wavelength $\lambda_2$ between say 740 and 820 nm, preferably $\lambda_2$=785 nm with a numerical aperture of below 0.5, preferably 0.45. Discs of Blue-DVD format may be scanned with laser radiation of a third wavelength $\lambda_3$ between say 365 and 445 nm, preferably $\lambda_3$=405 nm.

The phase structure 11 on the objective lens 10 is arranged to compensate for spherical aberration caused by the difference in thickness 31 and 33 of the transparent layers of a Red-DVD or Blue-DVD and a CD carrier, respectively. The structure similarly corrects for spherochromatism and chromatic aberration. Effectively, the phase structure 11 is designed to introduce an amount of wavefront deviation in light passing therethrough which compensates for the spherical aberration caused by, for example, a change in information layer depth.

In this embodiment of the invention, reading and writing data on discs of a different format using a single objective element is achieved by using a hybrid lens in an infinite-conjugate mode. Such a hybrid lens can be formed by applying a phase profile on one of the surfaces of a refractive lens, for example by a lithographic process or by diamond turning.

The objective lens 10 is shown as a convex-convex lens; however other lens element types such as plano-convex or convex-concave lenses may also be used. Whilst the objective system is in this embodiment a single lens, it may be a compound lens containing two or more lens elements. The objective lens 10 may for example include a refractive objective lens element and a planar lens phase element. The phase element or phase structure may also comprise or be provided on an optical element in the objective system or separate from the objective system, for example on a quarter wavelength plate or a beam splitter.

Figure 3:
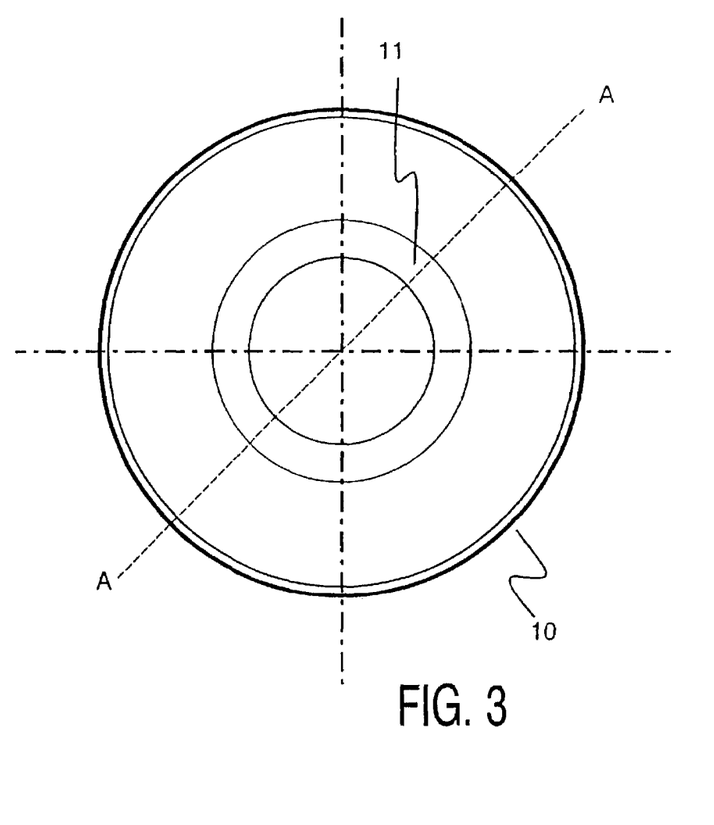
FIG. 3 is a schematic front view of the objective lens of FIG. 2.

FIG. 3 is a schematic front view of the objective lens 10 illustrating the phase structure. It can be seen that a circular structure has been applied with a pattern of coaxial annular ring-shaped pattern elements with gradually increasing width towards the centre of the lens. Each pattern element defines a so-called zone of the phase element. In order to enable operation of the lens for multiple wavelengths in an infinite-conjugate manner, the lens generates a different amount of spherical aberration (i.e. a different amount of wavefront deviation) for each wavelength to correct for aberrations resulting, for example, from differences in disc thicknesses.

The generation of different spherical aberrations is achieved by arranging the phase structure so that the zones of the structure are of differing heights, the heights being chosen so that a phase difference is introduced into the beam passing through the lens—the particular phase difference applied to a given wavelength being chosen to counteract the various detrimental effects of the types described above.

In this connection, it is important to note that the phase structure employed in embodiments of the invention has a non-periodic pattern, and therefore does not form diffraction orders. As a consequence of this, the phase structure to be described does not exhibit inherent losses of the type that might be exhibited by a diffraction grating. The first step in designing a suitable phase structure is to choose one wavelength as a "design wavelength" and to optimise the optical system for that wavelength. This means that any phase structure applied to the lens 10 should not affect a beam of the design wavelength passing therethrough. Hence it should result in a substantially flat wavefront. In other words, the phase structure should only introduce a phase change that is equal to a constant plus a multiple of, approximately $2\pi$ radians. It should be noted that the term "multiple" as used herein should be construed to include any integer, including negative integers, 0 and 1.

As is well known, the phase change $\phi$ introduced into a beam of wavelength $\lambda_1$ as that beam passes through a step of height h, may be written as:

$$\phi_{\lambda_1} = 2\pi(n_{\lambda_1} - n_0)\frac{h}{\lambda_1} \qquad (1)$$

where $n_{\lambda_1}$, is the refractive index of the step for light of wavelength $\lambda_1$, and $n_0$ is the refractive index of the preceding medium before entering the step ($n_0$=1 if the preceding medium is air).

As mentioned above, for the design wavelength $\phi$ should be equal to $2\pi$ or to an integer multiple thereof (so that the phase structure has no effect on light of the design wavelength).

Putting $\phi$ equal to $2\pi$ enables Equation (1) to be rearranged for $h_1$ to give the height $h_1$ of a step which at wavelength $\lambda_1$ gives rise to a phase change of $2\pi$:

$$h_1 = \frac{\lambda_1}{(n_{\lambda_1} - n_0)} \qquad (2)$$

Similar expressions may be derived for $h_2$ (the height of step required to give a $2\pi$ phase change at $\lambda_2$) and $h_3$ (the height of step required to give a $2\pi$ phase change at $\lambda_3$).

$$h_2 = \frac{\lambda_2}{(n_{\lambda_2} - n_0)} \quad (3)$$

$$h_3 = \frac{\lambda_3}{(n_{\lambda_3} - n_0)} \quad (4)$$

Let us now consider what phase change a step of height $h_1$ will have on light of wavelength $\lambda_2$ and $\lambda_3$ passing therethrough. From Equation (1) we can write:

$$\varphi_{\lambda_2} = 2\pi(n_{\lambda_2} - n_0)\frac{h_1}{\lambda_2} \quad \text{or} \quad \frac{\lambda_2 \varphi_{\lambda_2}}{2\pi(n_{\lambda_2} - n_0)} = h_1 \quad (5)$$

Substituting for $h_1$ from Equation (2) gives:

$$\frac{\lambda_2 \varphi_{\lambda_2}}{2\pi(n_{\lambda_2} - n_0)} = \frac{\lambda_1}{(n_{\lambda_1} - n_0)} \quad \text{or} \quad (6)$$

$$\varphi_{\lambda_2} = 2\pi(n_{\lambda_2} - n_0)\frac{\lambda_1}{(n_{\lambda_1} - n_0)\lambda_2} \quad (7)$$

If we then substitute in Equation (7) for $\lambda_1$ and $\lambda_2$ (from Equations (2) & (3)), we have:

$$\varphi_{\lambda_2} = 2\pi \frac{(n_{\lambda_2} - n_0)(n_{\lambda_1} - n_0)h_1}{(n_{\lambda_1} - n_0)(n_{\lambda_2} - n_0)h_2} \quad \text{or} \quad (8)$$

$$\varphi_{\lambda_2} = 2\pi \frac{h_1}{h_2} \quad (9)$$

A similar expression can be derived for $\phi_{\lambda_3}$:

$$\varphi_{\lambda_3} = 2\pi \frac{h_1}{h_3} \quad (10)$$

It can therefore be seen that a step of height $h_1$, which introduces a phase change of $2\pi$, for radiation of wavelength $\lambda_1$ introduces a phase change of $2\pi(h_1/h_2)$ and $2\pi(h_1/h_3)$ for radiation of the second and third wavelengths, respectively.

At multiples, m, of the step height $h_1$, it will be apparent from equations (9) and (10) that the phase difference at the second and third wavelengths will vary as: $2\pi m(h_1/h_2)$ and $2\pi m(h_1/h_3)$, respectively.

However, because $(h_1/h_2)$ and $(h_1/h_3)$ can be approximated by rational numbers, multiples of the step height $h_1$ will only give rise to a limited number of substantially different phase steps at the other two wavelengths—the number of different phase steps being equal to the number of times the rational number $(h_1/h_2)$ or $(h_1/h_3)$ can be summed until the resultant phase change ($\phi$ is at least approximately an integer multiple of $2\pi$.

Let $p_2$ be the number of different steps for $\lambda_2$, and $p_3$ be the number of different steps for $\lambda_3$.

As $p_2$ and $p_3$ are different, different combinations of phase steps for $\lambda_2$ and $\lambda_3$ can be selected simply by selecting different integer multiples, m, of step height $h_1$. In other words, the teachings of this invention enable a phase structure to be formed which introduces a phase difference of $2\pi$ at the design wavelength, and any combination of the aforementioned discrete phase differences at other wavelengths.

If we now consider the specific example of a device for reading data from Red-DVDs, Blue-DVDs and CDs we can calculate the appropriate step heights for the phase structure which will enable data read-out to be achieved from each of the three different media using three discrete wavelengths of light and a single objective lens.

As mentioned above, Red-DVDs are read with light of wavelength 660 nm. Accordingly, in this example our design wavelength $\lambda_1=660$ nm, and at this wavelength we require the phase structure to introduce an integer multiple of $2\pi$ phase difference in light passing therethrough. The second wavelength, $\lambda_2$, is equal to 785 nm for reading data from CDs, and the third wavelength, $\lambda_3$, is equal to 405 nm for reading data from Blue-DVDs. In the case where the phase structure 11 is of diacryl, $n_{\lambda,1}=1.564$, $n\lambda_2=1.559$ and $n_{\lambda,3}=1.594$. If we assume that $n_0=1$, it is possible to calculate using Equations (2), (3) and (4) the step heights $h_1$, $h_2$ and $h_3$ to be 1.170 µm, 1.404 µm and 0.682 µm respectively.

From Equations (9) and (10) it can be calculated that the phase difference introduced by a step of height $h_1$ in a beam of wavelength $\lambda_2$ and $\lambda_3$ is equal to $2\pi(0.833)$ radians for $\lambda_2$, and $2\pi(1.716)$ radians for $\lambda_3$. Since $0.8333 \sim 5/6$ and $1.716 \sim 12/7$ we have $p_2=6$ and $p_3=7$. If we tabulate this data for multiples, m, of the step height $h_1$ we can construct a table, thus:

TABLE 1

Phase Difference at $\lambda_2$ and $\lambda_3$ introduced by a step of height $mh_1$

| m | Phase $\phi_{\lambda 2}$ (mod $2\pi$) radians | Phase $\phi_{\lambda 3}$ (mod $2\pi$) radians |
|---|---|---|
| −2 | 2.094 | 3.575 |
| −1 | 1.047 | 1.787 |
| 0 | 0.000 | 0.000 |
| 1 | *5.235* | 4.496 |
| 2 | *4.188* | 2.709 |
| 3 | *3.142* | 0.921 |
| 4 | *2.094* | *5.417* |
| 5 | *1.047* | *3.630* |
| 6 | *0.000* | *1.843* |
| 7 | 5.235 | *0.055* |
| 8 | 4.188 | *4.551* |
| 9 | 3.142 | *2.764* |
| 10 | 2.094 | *0.977* |
| 11 | 1.047 | 5.472 |
| 12 | 0.000 | 3.685 |

From Table 1, it can be seen that $p_2$ is equal to six and that $p_3$ is equal to seven (see the emboldened and italicised numbers in columns $\phi_2$ and $\phi_3$ respectively), and further that each set of discrete phase steps repeats ad infinitum with increasing ranges of multiples m of the step height $h_1$. For example, $\phi_2$ runs from m=1 to m=6, and then repeats from m=7 to m=12. Similarly, $\phi_3$ runs from m=4 to m=10, and then repeats from m=11 to m=17 (not shown).

As $p_2$ and $p_3$ are different, every combination of discrete phase steps for $\lambda_2$ and $\lambda_3$ is available for selection simply by selecting the appropriate multiple m of the step height $h_1$.

In general terms, it is possible to determine a mathematical expression for the number $p_i$ of substantially different phase steps for a step height $h_i$ at a wavelength $\lambda_i$ as will now be shown.

If we define $h_1$ to be the height of a phase structure which introduces a phase step of $2\pi$ at wavelength $\lambda_1$, and similarly $h_i$ to be the height of a structure which introduces a phase step of $2\pi$ at another wavelength $\lambda_i$. Then, to find the number $p_i$ of substantially different phase steps for the height $h_i$ corresponding to $\lambda_i$ we write the ratio $h_i/h_1$ as a Continued Fraction $CF^i$. In general a continued fraction (CF) is defined by:

$$CF = b_0 + \cfrac{1}{b_1 + \cfrac{1}{b_2 + \cfrac{1}{b_3 + \cfrac{1}{b_4 + \ldots}}}} \equiv b_0 + \frac{1}{b_1+} \frac{1}{b_2+} \frac{1}{b_3+} \ldots \quad (11)$$

This last equation is just another notation for a CF (see for instance Page 19 of the "Handbook of mathematical functions", by M. Abramowitz and I. A. Stegun (Dover Publications, New York, 1970)).

When the numbers $b_k$ are integer numbers the CF always converges. As a result, we can define the truncation of this CF to the $m^{th}$ order to be $CF_m$ which can be written as:

$$CF_m = b_0 + \frac{1}{b_1+} \frac{1}{b_2+} \frac{1}{b_3+} \ldots \frac{1}{b_m} = \frac{A_m}{B_m} \equiv \{b_0, b_1, b_2, \ldots, b_m\} \quad (12)$$

where $A_m$ and $B_m$ are integers determined by $$A_m = b_m A_{m-1} + A_{m-2}$$

$$B_m = b_m B_{m-1} + B_{m-2}$$

$$A_{-1} = 1, A_0 = b_0, B_{-1} = 0, B_0 = 1$$

For instance, we have $$CF_4 = b_0 + \cfrac{1}{b_1 + \cfrac{1}{b_2 + \cfrac{1}{b_3 + \cfrac{1}{b_4}}}} \equiv b_0 + \frac{1}{b_1+} \frac{1}{b_2+} \frac{1}{b_3+} \frac{1}{b_4} \quad (13)$$

The coefficients $b_k$ can be determined as follows. Let $$a_0 = \frac{h_1}{h_i} \quad 14$$

Then we find $$b_0 = \text{Int}[a_0] \quad (15)$$

where Int[ ] means taking the integer part of $a_0$ (for instance Int[3.253]=3).

If we then define $$a_1 = a_0 - b_0$$

and let $$b_1 = \text{Int}\left[\frac{1}{a_1}\right] \quad (17)$$

$$a_2 = \frac{1}{a_1} - b_1 \quad (18)$$

We have $$b_m = \text{Int}\left[\frac{1}{a_m}\right] \quad (19)$$

$$a_{m+1} = \frac{1}{a_m} - b_m \quad (20)$$

and the $CF_m$ is uniquely defined. To find the number $p_i$ we must determine the $CF_k^i$ corresponding to $h_1/h_i$ such that for that integer value of k the $CF_k^i$ satisfies the relation $$\left| CF_k^i - \frac{h_1}{h_i} \right| \leq 0.005 \quad (21)$$

for the first time. The rational approximation is then $$\frac{h_1}{h_i} \approx CF_k = \frac{A_k}{B_k} \quad (22)$$

and from this we find that the number $p_i$ of substantially different phase steps for the height $h_i$ corresponding to $\lambda_i$ is given by $$p_i = B_k \quad (23)$$

This can be seen as follows.

$$\varphi_{\lambda_i} = 2\pi(m + p_i)\frac{h_1}{h_i} \quad (25)$$

$$\approx 2\pi m \frac{h_1}{h_i} + 2\pi p_i \frac{A_k}{B_k}$$

$$\approx 2\pi m \frac{h_1}{h_i} + 2\pi A_k$$

If we take a step height of $mh_1$ with m integer, the phase change introduced at wavelength $\lambda_i$ is then given by $$\varphi_{\lambda_i} = 2\pi m \frac{h_1}{h_i} \quad (24)$$

If we consider now the height $(m+p_i) h_1$, the same phase for $\lambda_i$ as with the height $mh_1$ is expected. This can be shown as follows:

Since $A_k$ is an integer number, the phase modulo $2\pi$ introduced by the step heights $mh_1$ and $(m+p_i) h_1$ are substantially equal.

If we now consider the case where the phase structure 10 is made of diacryl, $n_{\lambda,1}=1.564$, $n_{\lambda,2}=1.559$ and $n_{\lambda,3}=1.594$. If we assume that $n_0=1$, it is possible to calculate using Equations (2), (3) and (4) the step heights $h_1$, $h_2$ and $h_3$ to be 1.170 μm, 1.404 μm and 0.682 μm respectively.

From Equations (9) and (10) it can also be calculated that the phase difference introduced by a step of height $h_1$ in a beam of wavelength $\mu_2$ and $\mu_3$ is equal to $2\pi(0.833)$ radians for $\lambda_2$, and $2\pi(1.716)$ radians for $\lambda_3$. Expanding the ratio's $h_1/h_2=0.833$ and $h_1/h_3=1.716$ in a continued fraction as explained above (see table III and IV) we find that $0.8333 \sim 5/6$ and $1.716 \sim 12/7$, hence we have $p_2=6$ and $p_3=7$.

TABLE II $h_1/h_2 = 0.833$

| k | $CF_k^2$ | $A_k/B_k$ | $\|CF_k^2 - 0.833\|$ | $B_k$ |
|---|---|---|---|---|
| 1 | {0,1} | 1/1 | 0.167 | 1 |
| 2 | {0,1,4} | 4/5 | 0.033 | 5 |
| 3 | {0,1,4,1} | 5/6 | 0.000 | 6 |

TABLE III $h_1/h_3 = 1.716$

| k | $CF_k^3$ | $A_k/B_k$ | $\|CF_k^3 - 1.716\|$ | $B_k$ |
|---|---|---|---|---|
| 1 | {1,1} | 2/1 | 0.284 | 1 |
| 2 | {1,1,2} | 5/3 | 0.049 | 3 |
| 3 | {1,1,2,1} | 7/4 | 0.034 | 4 |
| 4 | {1,1,2,1,1} | 12/7 | 0.002 | 7 |

In conclusion, it is possible to express the number $p_i$ of substantially different phase steps for the height $h_i$ corresponding to $\lambda_i$ as follows. Write the ratio $h_1/h_i$ as a Continued Fraction $CF^i$ according to Equation (11); truncate the fraction as soon as the condition set out in Equation (21) is met; determine the values $A_k$ and $B_k$; and the number of substantially different phase steps for the height $h_i$ corresponding to $\lambda_i$ is then given by $p_i=B_k$.

The objective lens 10 in FIG. 2, in this example, is a plano-aspherical element. The objective lens 10 has thickness on the optical axis of 2.401 mm and entrance pupil diameter of 3.3 mm. The lens body of the objective lens is made of LAFN28 Schott glass with refractive index $n=1.7682$ at wavelength $\lambda_1=660$ nm, $n=1.7625$ at $\lambda_2=785$ nm and $n=1.7998$ at $\lambda_3=405$ nm. The convex surface of the lens body which is directed towards the collimator lens has radius 2.28 mm. The surface of the objective lens facing the record carrier is flat. The aspherical shape is realized in a thin layer of acryl on top of the glass body. The lacquer has refractive index $n=1.5640$ at 660 nm, $n=1.5588$ at 785 nm and $n=1.5945$ at 405 nm. The thickness of this layer on the optical axis is 17 microns. The rotational symmetric aspherical shape is given by the equation $$z(r) = \sum_{i=1}^{5} B_{2i} r^{2i}$$

with z the position of the surface in the direction of the optical axis in millimeters, and r the distance to the optical axis in millimeters, and $B_k$ the coefficient of the k-th power of r. The value of the coefficients $B_2$ until $B_{10}$ are 0.239104, 0.0050896354, $8.9127376 \cdot 10^{-5}$, $-8.7208131 \cdot 10^{-5}$, $-1.8258426 \cdot 10^{-6}$, respectively. The free working distance hence the distance between the objective lens 10 and the disk is 1.049 mm for DVD at $\lambda_1=660$ nm with cover layer thickness of the disk is 0.6 mm, 0.6952 mm for CD at $\lambda_2=785$ nm with cover layer thickness of the disk is 1.2 mm and 0.9710 mm for DVD at $\lambda_3=405$ nm with cover layer thickness of the disk is 0.6 mm. The cover layer thickness of the disk is made of polycarbonate with refractive index $n=1.5798$ at wavelength $\lambda=660$ nm, $n=1.5731$ at wavelength $\lambda_2=785$ nm and $n=1.6188$ at wavelength $\lambda_3=405$ nm. The objective is designed in such a way that when reading a DVD at 660 nm and DVD disk at 405 nm no spherochromatism is introduced. Hence the objective is already suited for DVD red and blue readout. In order to make the lens suitable for CD readout the spherical aberration arising due to the disk thickness difference and the spherochromatism has to be compensated. Using the method described by Messrs Katayama, Komatsu and Yamanaka described in their Applied Optics article entitled: "Dual-Wavelength optical head with a wavelength selective filter for 0.6 and 1.2 mm thick substrate optical disks" (see Applied Optics, Volume 38, No. 17 dated 10 Jun. 1999, page 3778) and similar by Messrs Hendriks, de Vries and Urbach described in the proceedings of the Optical Design and Fabrication conference held in Tokyo 2000 on page 325-328 entitled "Application of non-periodic phase structures in optical systems", it is possible to compensate for spherical aberrations and spherochromatism in a Red-DVD/CD system by providing a three phase step structure which introduces a relative phase in the CD case (i.e. when the optical medium is scanned with light at a wavelength of approximately 785 nm) of 0.00 radians, 1.047 radians and 2.094 radians; and a relative phase in the Red-DVD case of approximately $2\pi$ radians and integer multiples thereof (see tables 1 and 4).

From table 1 it is apparent that appropriate phase differences for correcting aberrations and other defects at the CD wavelength $\lambda_2$ may be provided by constructing a phase structure with steps of $0h_1$, $5h_1$, and $4h_1$, or $0h_1$, $-1h_1$, and $-2h_1$, for example.

However, if it is also desired to scan Blue-DVDs as well as CDs then the step heights chosen for scanning at the CD wavelength $\lambda_2$ must not introduce any appreciable phase gradient when the objective is illuminated with light of the Blue-DVD wavelength $\lambda_3$.

If we again refer to Table 1, it is apparent that by picking step heights of $12h_1$, $5h_1$, and $-2h_1$, (for example) we will introduce the desired phase difference of 0.00, 1.047 and 2.094 radians at the CD wavelength $\lambda_2$ and, in addition, an approximately equal phase difference of roughly 3.6 radians at the Blue-DVD wavelength $\lambda_3$.

As there is no appreciable phase gradient at the Blue-DVD wavelength, the roughly constant phase change caused by the phase structure has no effect upon scanning of Blue-DVDs.

In other words, by constructing a phase structure with step heights of $12h_1$, $5h_1$, and $-2h_1$ it is possible to provide an objective lens that enables scanning of CDs, Red-DVDs and Blue-DVDs.

At this juncture it is worth mentioning how one might go about constructing a step with a negative height. If one wished to construct a step of $-2h_1$, for example, one could add a layer of material of depth $2h_1$ to the entire surface of the lens (which gives rise to a constant wavefront offset having no influence on spot formation) and then remove the layer in those areas where it is desired to form the step.

Figure 4:
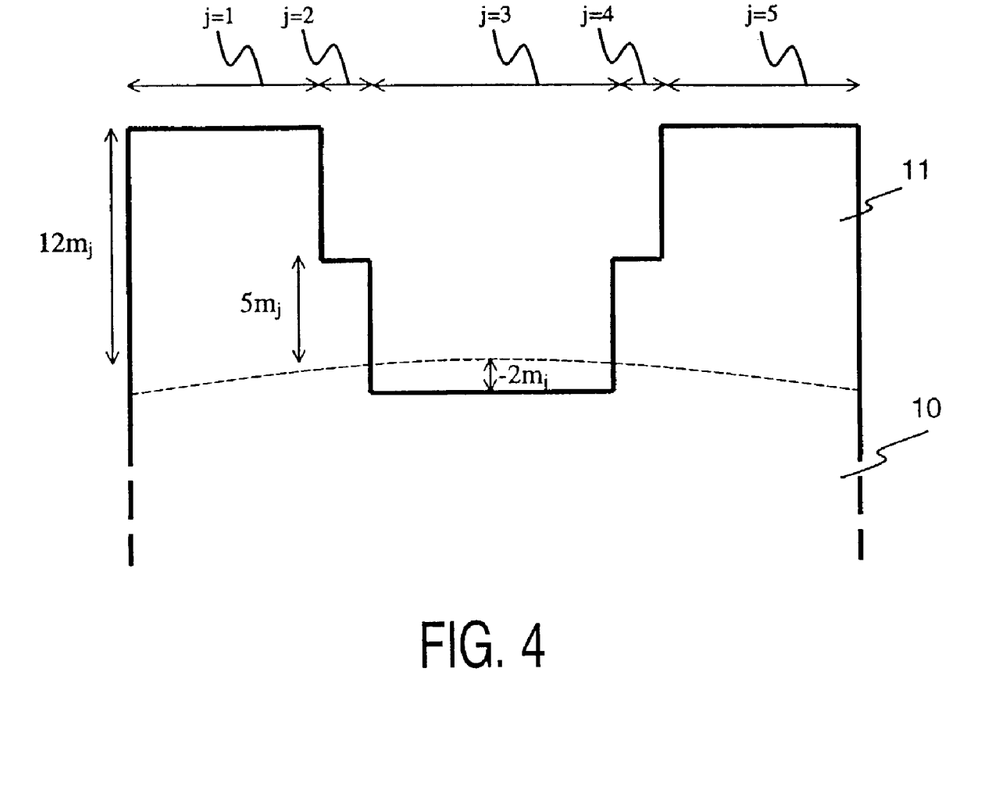
FIG. 4 is a cross-sectional view along the line A-A of FIG. 3. The first step on the left starts in the middle of FIG. 3.

Table 4 illustrates the measurements for a phase structure such as that described above with which it is possible to scan CDs, Red-DVDs and Blue-DVDs. FIG. 4 provides an exaggerated schematic cross-sectional view along the line A-A of FIG. 3, and shows a phase structure with a step height distribution such as that set out in Table 4.

TABLE 4

Step Height Distribution
(where: r is the radial pupil co-ordinate, and
$h_j$ is the height, in microns, of the phase structure in zone j)

| j | $r_{begin}$ zone j | $r_{end}$ zone j | $m_j$ | $h_j$ [μm] | phase CD (mod 2π) | phase Blue-DVD (mod 2π) |
|---|---|---|---|---|---|---|
| 1 | 0.00 | 0.40 | 12 | 14.040 | 0.000 | 3.685 ≈ 3.6 |
| 2 | 0.40 | 0.59 | 5 | 5.850 | 1.047 | 3.630 ≈ 3.6 |
| 3 | 0.59 | 1.10 | −2 | −2.340 | 2.094 | 3.575 ≈ 3.6 |
| 4 | 1.10 | 1.20 | 5 | 5.850 | 1.047 | 3.630 ≈ 3.6 |
| 5 | 1.20 | 1.65 | 12 | 14.040 | 0.000 | 3.685 ≈ 3.6 |

Using such a structure it has been found that the rms wavefront aberration (which is the average optical path difference of the wavefront over the entire entrance pupil of the lens—or in other words, a measure of the aberration introduced by the lens) introduced at $\lambda_3$ is in the region of 17 mλ, and at $\lambda_2$ is in the region of 43 mλ.

When the rms wavefront aberration (measured in waves λ) is below 0.07λ the optical system is described as being "diffraction limited", which means that the aberrations introduced by imperfections in the lens are smaller than the width of the spot due to diffraction effects. For correct scanning, the total rms wavefront aberration of the whole optical system should be less than 0.07λ. Since the rms wavefront aberrations at $\lambda_2$ and $\lambda_3$ are less than 0.07λ (and since no appreciable aberration is introduced at the design wavelength $\lambda_1$), the system described above is suitable for scanning CDs, Red-DVDs and Blue-DVDs.

Although here only the case where at the third wavelength a flat wavefront is produced by the phase structure is considered, extending this to the case where at the third wavelength spherical aberration is produced can be done as follows. For the third wavelength there are $p_3$ substantially different phase steps (see for instance table 1, column 3). To compensate with these phase steps an amount of spherical aberration (which could be introduced when at the third wavelength the cover layer thickness of the disc is different form that of the first wavelength or when there is an amount of spherochromatism present) in the third configuration proceed in the same way as explained before to achieve spherical aberration correction for the CD configuration while introducing a flat wavefront for the Red-DVD and Blue-DVD case. Now the structure is designed to generate spherical aberration for the Blue-DVD case, while it introduces a flat wavefront for the Red-DVD and the CD case. In this way we end up with two phase structure designs, one introducing the desired amount of spherical aberration for the second wavelength while having no effect for wavelength one and three; the other one introducing the desired amount of spherical aberration for the third wavelength while having no effect for wavelength one and two. The final step in the design is simply adding both structures on top of each other. The resulting phase structure will in general be more complex because the width of the plurality of phase elements of each of the two separate structures may be different.

Whilst this embodiment relates generally to the case where one wishes to read data from three different types of optical media with three associated wavelengths of light, it will be appreciated by persons skilled in the art that the teachings of this invention may be applied to systems where it is desired to read (or write) data at a greater number of wavelengths.

For example, if it were desired to additionally scan media using light of a fourth wavelength $\lambda_4$ (for example for an additional type of optical media), then table 1 would be expanded to include a fourth column of phase change $\phi_4$ which would comprise multiples of the ratio $h_1/h_4$. Since $\lambda_4$ would be different to $\lambda_1$, $\lambda_2$ or $\lambda_3$, the number of discrete phase steps $p_4$ would also be different to $p_2$ or $p_3$. As a result, it would then be possible to select every combination of phase change $\phi_2$, $\phi_3$ and $\phi_4$ simply by selecting appropriate values of m. In this way it would then be possible to provide a phase structure which enabled data read-out, for example, from four different optical media at four different wavelengths.

It can be seen therefore that the teachings of this invention may be applied to provide a device for scanning a plurality of different types of optical media, for example with associated different wavelengths of light.

From the above it will be understood that the scope of this invention extends to phase structures which approximate:
(a) a spherical aberration wavefront at the first wavelength $\lambda_1$, a flat wavefront at the second wavelength $\lambda_2$, and a flat wavefront at the third wavelength $\lambda_3$; or
(b) a spherical aberration wavefront at the first wavelength $\lambda_1$ a flat wavefront at the second wavelength $\lambda_2$, and a spherical aberration wavefront at the third wavelength $\lambda_3$.

This results from the fact that there are two effects giving rise to spherical aberration: (i) a change in refractive index resulting from a change in wavelength (called spherochromatism), and (ii) a change in cover layer thickness (for example, DVDs have a cover layer that is approximately 0.6 mm thick whereas CDs have a cover layer of that is approximately 1.2 mm thick).

Effect (i) is typically small in comparison with effect (ii) and as a consequence when the wavelength varies and the cover layer thickness does not vary, it is possible to compensate for spherochromatism in the lens design of the objective system (as is described herein with respect to a DVDBlue, DVDRed and CD system).

In circumstances when the cover layer thicknesses are all different or the spherochromatism cannot be compensated for, the phase structure (b) can still provide a system which is capable of reading optical data carriers with three different wavelengths.

Whilst particular preferred embodiments of the invention have been described herein, it will be understood that modifications may be made within the scope of the invention as defined in the appended claims.

For example, whilst in the embodiment described above the phase structure 11 is provided on the lens 10 it will be appreciated that the phase structure could instead be provided on an optical element separate from the objective lens, for example on a quarter wavelength plate or a beam splitter.

In addition, it will also be understood that, where the term "approximate" or "approximation" is used herein, that it is intended to cover a range of possible approximations, the definition including approximations which are in any case sufficient to provide a working embodiment of an optical scanning device serving the purpose of scanning different types of optical record carriers.

The invention claimed is:

1. An optical scanning device for scanning of a first, second and third type of optical record carrier with radiation of a first wavelength $\lambda_1$, a second wavelength $\lambda_2$ and a third wavelength $\lambda_3$, respectively, the three wavelengths being substantially different, the device comprising:

a radiation source for emitting a beam of said radiation, an objective system for converging the beam on a selected one of the optical record carriers, and a phase structure arranged in the path of the beam, the phase structure comprising a plurality of phase elements of different heights, forming a non-periodic stepped profile of optical paths in the beam, wherein the stepped profile substantially approximates a flat wavefront at the first wavelength $\lambda_1$, a spherical aberration wavefront at the second wavelength $\lambda_2$, and a flat or spherical aberration wavefront at the third wavelength $\lambda_3$ and wherein an attainable number of substantially different phases for different heights of a phase element at the wavelength $\lambda_2$ is different from an attainable number of substantially different phase steps for different heights of a phase element at the $\lambda_3$, wherein $|\lambda_1-\lambda_2|$, $|\lambda_2-\lambda_3|$ and $|\lambda_1-\lambda_3|$ are each larger than 50 nm.

2. The scanning device according to claim 1, wherein the differences in length between the optical paths at the first wavelength $\lambda_1$ correspond to phase changes in the beam substantially equal to multiples of $2\pi$.

3. The scanning device according to claim 2, wherein the attainable number $B_k$ of substantially different phase steps at wavelength $\lambda_i$ for i equal to 2 and 3 is determined by an inequality $$\left|\frac{A_k}{B_k} - \frac{h_1}{h_i}\right| \geq 0.005$$

where the integer k is the smallest positive integer that complies with the inequality and with $$\frac{A_k}{B_k} = \{b_0, b_1, ,b_k\}$$

where $\{b_0, b_1, \ldots, b_k\}$ is a continued fraction truncated at the $k^{th}$ term, and $h_1$, $h_i$ are the heights of a phase element that introduces a $2\pi$ phase change in the optical path at the wavelengths $\lambda_1$ and $\lambda_i$ respectively.

4. The scanning device according to claim 1, wherein said phase structure exhibits a difference between a lowest phase step $\Phi_{min}$ and a highest phase step $\Phi_{max}$ at $\lambda_1$ which complies with:

$|\Phi_{max}-\Phi_{min}|>2\pi B_k$ where $B_k$ is the lowest attainable number of substantially different phase steps at one of the wavelength $\lambda_i$ for i equal to 2 and 3.

5. The scanning device according to claim 1, wherein the phase structure is generally circular and the steps of said stepped profile are generally annular.

6. The scanning device according to claim 1, wherein said phase structure is formed on a face of a lens of the objective system.

7. The scanning device according to claim 1, wherein said phase structure is formed on an optical plate provided between the radiation source and the objective system.

8. The scanning device according to claim 7, wherein said optical plate comprises a quarter wavelength plate or a beam splitter.

9. A lens for use in an optical device for scanning a first, second and third type of optical record carrier with a beam of radiation of a first wavelength $\lambda_1$, a second wavelength $\lambda_2$ and a third wavelength $\lambda_3$, respectively, the three wavelengths being substantially different, the lens comprising: a phase structure arranged in the path of the beam, the phase structure comprising a plurality of phase elements of different heights, forming a non-periodic stepped profile of optical paths in the beam, wherein the stepped profile substantially approximates a flat wavefront at the first wavelength $\lambda_1$, a spherical aberration wavefront at the second wavelength $\lambda_2$, and a flat or spherical aberration wavefront at the third wavelength $\lambda_3$ and wherein an attainable number of substantially and a flat or spherical aberration wavefront at the third wavelength $\lambda_3$ and wherein an attainable number of substantially different phases for different heights of a phase element at the wavelength $\lambda_2$ is different phase steps for different heights of a phase element at the $\lambda_3$, wherein $|\lambda_1-\lambda_2|$, $|\lambda_2-\lambda_3|$ and $|\lambda_1-\lambda_3|$ are each larger than 50 nm.

10. The lens according to claim 9, wherein the differences in length between the optical paths at the first wavelength $\lambda_1$, correspond to phase changes in the beam substantially equal to multiples of $2\pi$.

11. The lens according to claim 10, wherein the attainable number $B_k$ of substantially different phase steps at wavelength $\lambda_i$ for i equal to 2 and 3 is determined by an inequality $$\left|\frac{A_k}{B_k} - \frac{h_1}{h_i}\right| \geq 0.005$$

where the integer k is the smallest positive integer that complies with the inequality and with $$\frac{A_k}{B_k} = \{b_0, b_1, ,b_k\}$$

where $\{b_0, b_1, \ldots, b_k\}$ is a continued fraction truncated at the $k^{th}$ term, and $h_1$, $h_i$ are the heights of a phase element that introduces a $2\pi$ phase change in the optical path at the wavelengths $\lambda_1$ and $\lambda_i$ respectively.

12. The lens according to claim 9, wherein said phase structure exhibits a difference between a lowest phase step $\Phi_{min}$ and a highest phase step $\Phi_{max}$ at $\lambda_1$ which complies with:

$|\Phi_{max}-\Phi_{min}|>2\pi B_k$ where $B_k$ is the lowest attainable number of substantially different phase steps at one of the wavelength $\lambda_i$ for i equal to 2 and 3.

13. The lens according to claim 9, wherein the phase structure is generally circular and the steps of said stepped profile are generally annular.

14. The lens according to claim 9, wherein said phase structure is formed on an optical plate provided between the radiation source and the objective system, wherein said optical plate comprises a quarter wavelength plate or a beam splitter.

* * * * *